United States Patent [19]

Scott et al.

[11] Patent Number: 5,052,829
[45] Date of Patent: Oct. 1, 1991

[54] CLAMPED BEARING HANGER ASSEMBLY

[75] Inventors: Martin Scott, Brewster, Mass.; Craig Siebert, Ossining, N.Y.

[73] Assignee: Metallized Carbon Corporation, Ossining, N.Y.

[21] Appl. No.: 575,420

[22] Filed: Aug. 30, 1990

[51] Int. Cl.⁵ ............................................ F16C 19/06
[52] U.S. Cl. ..................................... 384/510; 384/537
[58] Field of Search ............... 384/510, 537, 584, 585, 384/428, 444

[56] References Cited

U.S. PATENT DOCUMENTS 2,988,407  6/1961  Reed ................................... 384/510
4,645,361  2/1987  Lakin .................................. 384/537
4,758,101  7/1988  Roof et al. ......................... 384/537
4,854,747  8/1989  Siebert et al. ..................... 384/537

Primary Examiner—Lenard A. Footland
Attorney, Agent, or Firm—Jordan B. Bierman

[57] ABSTRACT

A hanger assembly comprising a shroud and a releasable bearing. The shroud has a pair of tongues which are adapted to be inserted into complementary slots on the housing of the bearing. Troughs are provided in the tongues and complementary tabs are on the bearing. After insertion of the tongues into the slots, the tabs are bent around the tongues in the troughs, thereby mounting the bearing on the shroud.

5 Claims, 1 Drawing Sheet

CLAMPED BEARING HANGER ASSEMBLY

The present invention is directed to an improved hanger bearing assembly, more specifically one which can be firmly clamped in place and readily dismounted.

BACKGROUND OF THE INVENTION

The assembly of the present invention is particularly useful in connection with certain forms of drying ovens, although it is also useful in many other areas. Such drying ovens are usually of the tunnel type and the articles to be dried (often plywood sheets) are passed therethrough on rollers. Each roller requires a minimum of two bearings and, due to the high temperatures employed, these bearings must be able to withstand such temperatures for substantial periods of time without failing. Since these ovens are quite long (some exceed 300 feet), there are a large number of transverse rollers and, consequently, at least double that number of bearings supporting them.

Should any substantial number of bearings fail, the plywood sheets could no longer be moved through the oven and the entire operation comes to a complete halt. Obviously, this is extremely serious and the economic losses are substantial.

When this happens, it is imperative that the necessary bearing replacement take place as quickly as possible. Usually, substantially all of the bearings are replaced at the same time, in order to prevent a subsequent failure shortly after the bearings have been changed and to thereby minimize down time.

Due to the high temperatures referred to above, it is necessary to allow the oven to cool down to a point at which workmen can handle the bearings. In order to minimize this time, the crew used to effect the change wears asbestos gloves and other similar protective clothing. This enables then to get started on the job while the equipment is still fairly hot.

BRIEF DESCRIPTION OF THE PRESENT INVENTION

Therefore, it is among the objects of the present invention to provide an assembly wherein the bearing can be quickly and firmly connected to the shroud which, in turn, is attached to the frame of the device. It is also among the objects of the present invention to provide such an assembly wherein the bearing can be easily and quickly dismounted.

In essence, the present invention comprises the provision of a pair of slots on the bearing into which a corresponding pair of tongues, extending from the shroud, can fit. In order to lock the bearing and shroud together, a pair of tabs is provided on the bearing which is adapted to be bent into troughs formed on the outside of the tongues. The bearing need only be slipped over the tongues and each tab bent around the extremity thereof and the bearing is set. No further action is required.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
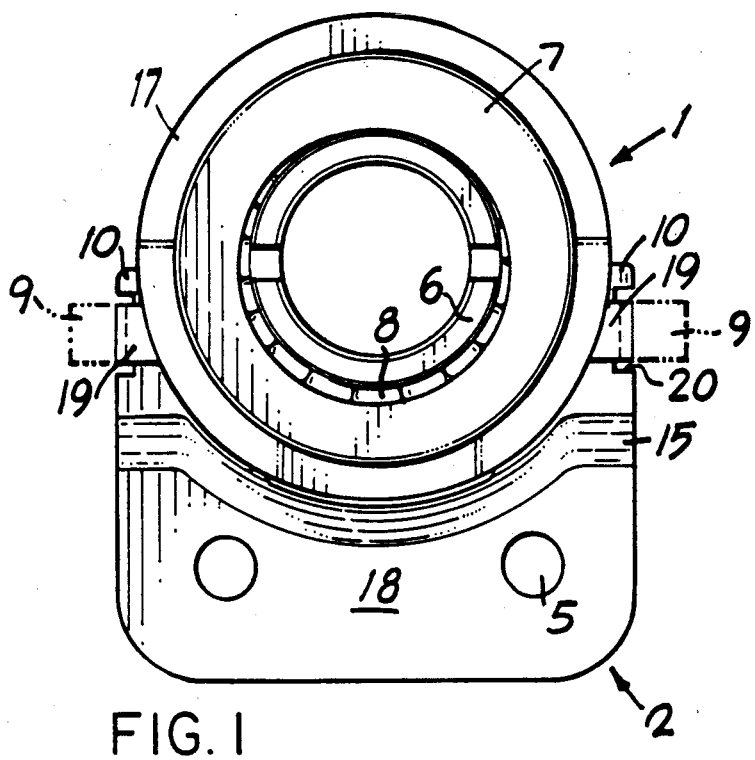
FIG. 1 is an elevation of the assembly of the present invention.

Assembly 1 comprises shroud 2 and bearing 3. Shroud 2 comprises plate 18 which carries tongues 4 extending from one edge thereof. Mounting holes 5 are provided in plate 18 to assist in securing shroud 2 to the frame (not shown) of the device in connection with which the assembly is intended to operate.

The bearing will be described in accordance with the accompanying drawings, but it will be appreciated that its particular form is, for the most part, not critical. Wide variations are possible, as the improvement represented by the present invention is of broad application.

Figure 2:
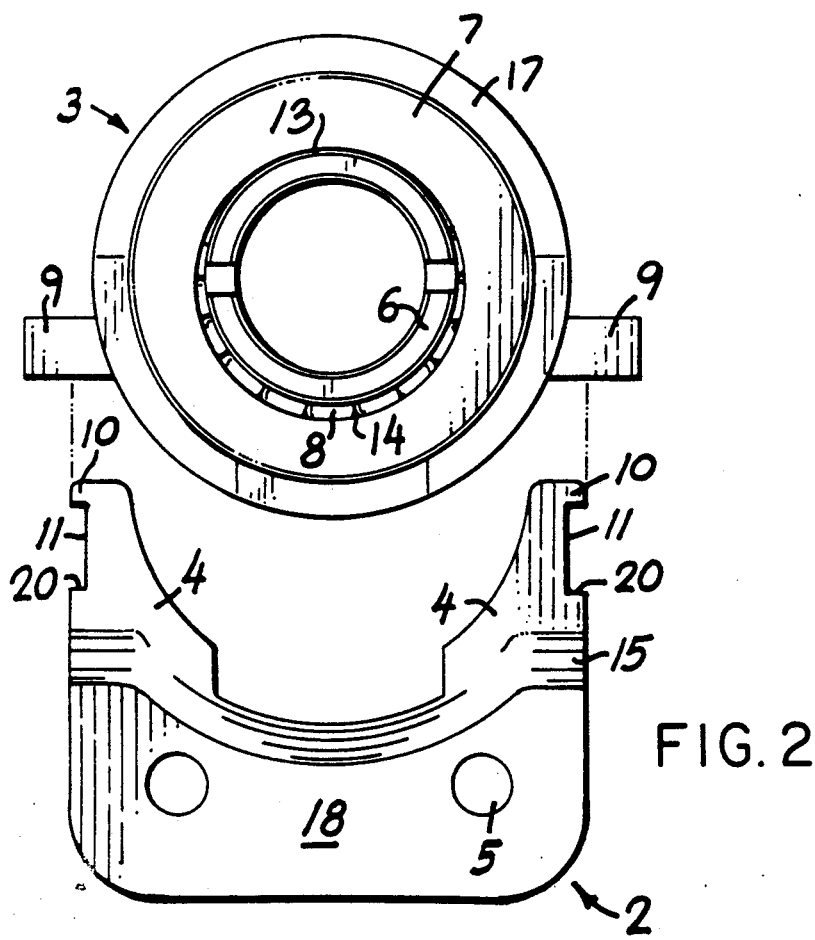
FIG. 2 is a view similar to that of FIG. 1 with the bearing and hanger separated.

Bearing 3 comprises inner race 6, an outer race (not shown), and ball bearings 8 therebetween. As can be seen in FIGS. 1 and 2, the outer race is situated in housing 7.

In the particular form of bearing illustrated, the opening in housing 7 is not concentric with inner race 6 or the outer race. In particular, lower gap 14 is substantially larger than upper gap 13. This configuration is intended to permit maximum wear of ball bearings 8 without the balls falling out from between the two races. This is accomplished because, as ball bearings 8 wear, the force of gravity will cause shaft 16 to move down as shown in FIGS. 1 and 2. Thus, upper gap 13 will gradually increase, while lower gap 14 will gradually decrease. This process will continue until upper gap 13 becomes large enough to permit ball bearings 8 to fall out of the channels between the races.

Figure 3:
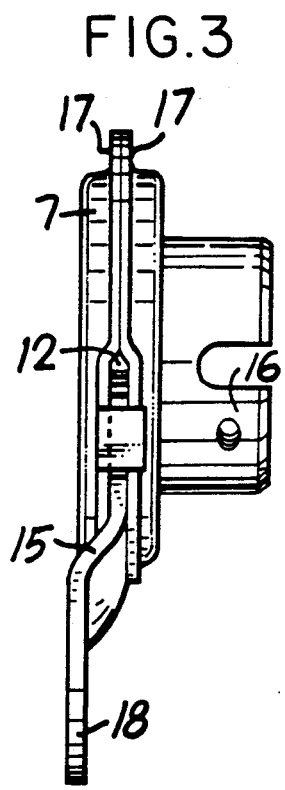
FIG. 3 is a left side view of the assembly as shown in FIG. 1.

As can best be seen in FIG. 3, bearing 3 is provided with slots 12 into which tongues 4 fit. Tabs 9 are bent into troughs 11 between projections 10 and shoulders 20. The size of troughs 11 is such that tabs 9 can fit readily therein.

In a preferred form of the device, tongues 4 are in a plane parallel to—and displaced normally from—plate 18. The two planes are connected by neck 15. It is also preferred that housing 7 be comprised of two pieces of metal secured to each other at flanges 17. By appropriate formation of flanges 17, slots 12 are easily provided.

When it is desired to use the present invention, slots 12 in bearing 3 are slipped over tongues 4 of shroud 2. Tabs 9 are in the position shown in broken lines in FIG. 1. Tabs 9 are then bent around tongues 4 in troughs 11 to assume the position shown at 19 in FIG. 1. To disassemble, the procedure is simply reversed or tabs 9 are cut off, whereby bearing 3 is released.

While only a limited number of specific embodiments of the present invention have been expressly disclosed, it is, nonetheless, to be broadly construed and not to be limited except by the character of the claims appended hereto.

What we claim is:

1. A hanger assembly comprising a shroud and a bearing releasably connected thereto,
   said shroud comprising a plate having tongues extending from an edge of said plate toward said bearing, one of said tongues being adjacent each end of said plate, a projection on each said tongue extending outwardly and, in cooperation with a shoulder on said tongue, forming a trough therebetween,
   said bearing comprising an inner race, an outer race, and ball bearings therebetween, a housing on said outer race having two slots in its periphery which are circumferentially spaced apart, at least a portion of each of said tongues in one of said slots in an inserted position, bendable tabs on said housing adjacent said slot and extending outwardly therefrom, said tabs bent into said trough between said projections and said shoulders in said inserted position, whereby said bearing and said shroud are releasably locked together.

2. The assembly of claim 1 wherein said housing surrounds said outer race.

3. The assembly of claim 1 wherein said tongues are in a plane parallel to and spaced apart in a normal direction from said plate.

4. The assembly of claim 1 wherein said plate is provided with at least one mounting hole.

5. The assembly of claim 4 wherein said plate is provided with two mounting holes spaced laterally apart from each other.

* * * * *